US010097807B2

(12) United States Patent
Karlsson et al.

(10) Patent No.: US 10,097,807 B2
(45) Date of Patent: Oct. 9, 2018

(54) METHOD, APPARATUS AND COMPUTER PROGRAM PRODUCT FOR BLENDING MULTIMEDIA CONTENT

(71) Applicant: Nokia Technologies Oy, Espoo (FI)

(72) Inventors: Tobias Karlsson, Malmö (SE); Tor Andrae, Dalby (SE); Amer Mustajbasic, Lund (SE)

(73) Assignee: NOKIA TECHNOLOGIES OY, Espoo (FI)

( * ) Notice: Subject to any disclaimer, the term of this patent is extended or adjusted under 35 U.S.C. 154(b) by 532 days.

(21) Appl. No.: 14/506,970

(22) Filed: Oct. 6, 2014

(65) Prior Publication Data

US 2015/0103142 A1    Apr. 16, 2015

(30) Foreign Application Priority Data

Oct. 10, 2013 (GB) .................................. 1317897.5

(51) Int. Cl.
*H04N 13/00* (2018.01)
*H04N 13/128* (2018.01)
*H04N 13/156* (2018.01)

(52) U.S. Cl.
CPC ......... *H04N 13/128* (2018.05); *H04N 13/004* (2013.01); *H04N 13/0022* (2013.01); *H04N 13/156* (2018.05)

(58) Field of Classification Search
CPC ................................................ H04N 13/0022
(Continued)

(56) References Cited

U.S. PATENT DOCUMENTS 5,706,417 A * 1/1998 Adelson .................... G06T 9/00
345/474
6,266,068 B1    7/2001 Kang et al.
(Continued)

FOREIGN PATENT DOCUMENTS

EP         2282550 A1    2/2011
WO    2014/044569 A1    3/2014

OTHER PUBLICATIONS

Luo et al., "Perspective-Aware Warping for Seamless Stereoscopic Image Cloning", Proceedings of ACM Transactions on Graphics, vol. 31, No. 6, Nov. 2012, pp. 1-8.
(Continued)

*Primary Examiner* — Jeremaiah C Hallenbeck-Huber
(74) *Attorney, Agent, or Firm* — Alston & Bird LLP

(57) ABSTRACT

In an example embodiment a method, apparatus and computer program product are provided. The method includes facilitating access to a plurality of source multimedia content, wherein at least one source multimedia of the plurality of source multimedia content comprises corresponding depth information. The method further includes generating a blend map by defining a plurality of depth layers. At least one depth layer of the plurality of depth layers is associated with a respective depth limit. Defining the at least one depth layer comprises selecting pixels of the at least one depth layer from the at least one source multimedia content of the plurality of source multimedia content based on the respective depth limit associated with the at least one depth layer and the corresponding depth information of the at least one source multimedia content. The method also includes blending the plurality of source multimedia content based on the blend map.

19 Claims, 4 Drawing Sheets

(58) Field of Classification Search
USPC .......................................................... 348/43
See application file for complete search history.

(56) References Cited

U.S. PATENT DOCUMENTS

| | | | |
|---|---|---|---|
| 7,460,731 B2 | 12/2008 | Senftner et al. | |
| 2003/0235338 A1* | 12/2003 | Dye | ............ G06T 9/00 |
| | | | 382/232 |
| 2006/0109284 A1 | 5/2006 | Hsieh et al. | |
| 2008/0246759 A1* | 10/2008 | Summers | ............ G06F 3/0304 |
| | | | 345/420 |
| 2011/0157155 A1* | 6/2011 | Turner | ............ G06T 19/00 |
| | | | 345/419 |
| 2011/0181591 A1 | 7/2011 | Benitez et al. | |
| 2011/0242277 A1 | 10/2011 | Do et al. | |
| 2011/0285910 A1* | 11/2011 | Bamji | ............ G01S 17/89 |
| | | | 348/631 |
| 2011/0304691 A1 | 12/2011 | Newton et al. | |
| 2012/0219236 A1 | 8/2012 | Ali et al. | |
| 2013/0069932 A1* | 3/2013 | Ha | ............ H04N 13/026 |
| | | | 345/419 |
| 2013/0230237 A1* | 9/2013 | Schlosser | ............ G06T 7/11 |
| | | | 382/164 |
| 2014/0063018 A1* | 3/2014 | Takeshita | ............ G06T 7/0051 |
| | | | 345/427 |

OTHER PUBLICATIONS

"Eye on", Retrieved on Oct. 8, 2014, Webpage available at : http://manual.eyeonline.com/eyeonmanual/fusion/tool-reference/composite-tools/merge.
"Depth Merge", Retrieved on Oct. 8, 2014, Webpage available at : http://docs.gimp.org/en/plug-in-depth-merge.html.
Search Report received for corresponding United Kingdom Patent Application No. 1317897.5, dated Apr. 7, 2014, 3 pages.

* cited by examiner

METHOD, APPARATUS AND COMPUTER PROGRAM PRODUCT FOR BLENDING MULTIMEDIA CONTENT

TECHNICAL FIELD

Various implementations relate generally to method, apparatus, and computer program product for blending multimedia content.

BACKGROUND

Various electronic devices such as cameras, mobile phones, and other devices are now used for capturing two or more multimedia content such as images, and videos. Such captured multimedia content may be used for post processing applications associated with display of multimedia content. Examples of post processing applications may include, but are not limited to blending of multiple multimedia content. Various implementations for blending the multimedia content facilitate blending by using predefined blend maps or segmentation which utilizes a segmented photographic image of a scene.

SUMMARY OF SOME EMBODIMENTS

Various aspects of example embodiments are set out in the claims.

In a first aspect, there is provided a method comprising: facilitating access to a plurality of source multimedia content, at least one source multimedia content of the plurality of source multimedia content comprising corresponding depth information; generating a blend map by defining a plurality of depth layers, at least one depth layer of the plurality of depth layers being associated with a respective depth limit, wherein defining at least one depth layer of the plurality of depth layers comprises selecting pixels of the at least one depth layer from the at least one source multimedia content of the plurality of source multimedia content based on a depth limit associated with the at least one depth layer and the corresponding depth information of the at least one source multimedia content; and blending the plurality of source multimedia content based on the blend map.

In a second aspect, there is provided an apparatus comprising at least one processor; and at least one memory comprising computer program code, the at least one memory and the computer program code configured to, with the at least one processor, cause the apparatus to perform at least: facilitate access to a plurality of source multimedia content, at least one source multimedia content of the plurality of source multimedia content comprising corresponding depth information; generate a blend map by defining a plurality of depth layers, at least one depth layer of the plurality of depth layers being associated with a respective depth limit, wherein defining at least one depth layer of the plurality of depth layers comprises selecting pixels of the at least one depth layer from a source multimedia content of the at least one source multimedia content of the plurality of source multimedia content based on a depth limit associated with the at least one depth layer and the corresponding depth information of the at least one source multimedia content; and blending the plurality of source multimedia content based on the blend map.

In a third aspect, there is provided a computer program product comprising at least one computer-readable storage medium, the computer-readable storage medium comprising a set of instructions, which, when executed by one or more processors, cause an apparatus to perform at least: facilitate access to a plurality of source multimedia content, at least one source multimedia content of the plurality of source multimedia content comprising corresponding depth information; generate a blend map by defining a plurality of depth layers, at least one depth layer of the plurality of depth layers being associated with a respective depth limit, wherein defining at least one depth layer of the plurality of depth layers comprises selecting pixels of the at least one depth layer from at least one source multimedia content of at least one source multimedia content of the plurality of source multimedia content based on a depth limit associated with the at least one depth layer and the corresponding depth information of the source multimedia content; and blending the plurality of source multimedia content based on the blend map.

In a fourth aspect, there is provided an apparatus comprising: means for facilitating access to a plurality of source multimedia content, at least one source multimedia content of the plurality of source multimedia content comprising corresponding depth information; means for generating a blend map by defining a plurality of depth layers, at least one depth layer of the plurality of depth layers being associated with a respective depth limit, wherein defining at least one depth layer of the plurality of depth layers comprises selecting pixels of the at least one depth layer from the at least one source multimedia content of the plurality of source multimedia content based on a depth limit associated with the at least one depth layer and the corresponding depth information of the at least one source multimedia content; and means for blending the plurality of source multimedia content based on the blend map.

In a fifth aspect, there is provided a computer program comprising program instructions which when executed by an apparatus, cause the apparatus to: facilitate access to a plurality of source multimedia content, at least one source multimedia content of the plurality of source multimedia content comprising corresponding depth information; generate a blend map by defining a plurality of depth layers, at least one depth layer of the plurality of depth layers being associated with a respective depth limit, wherein defining at least one depth layer of the plurality of depth layers comprises selecting pixels of the at least one depth layer from at least one source multimedia content of the plurality of source multimedia content based on a depth limit associated with the at least one depth layer and the corresponding depth information of the at least one source multimedia content; and by blending the plurality of source multimedia content based on the blend map.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
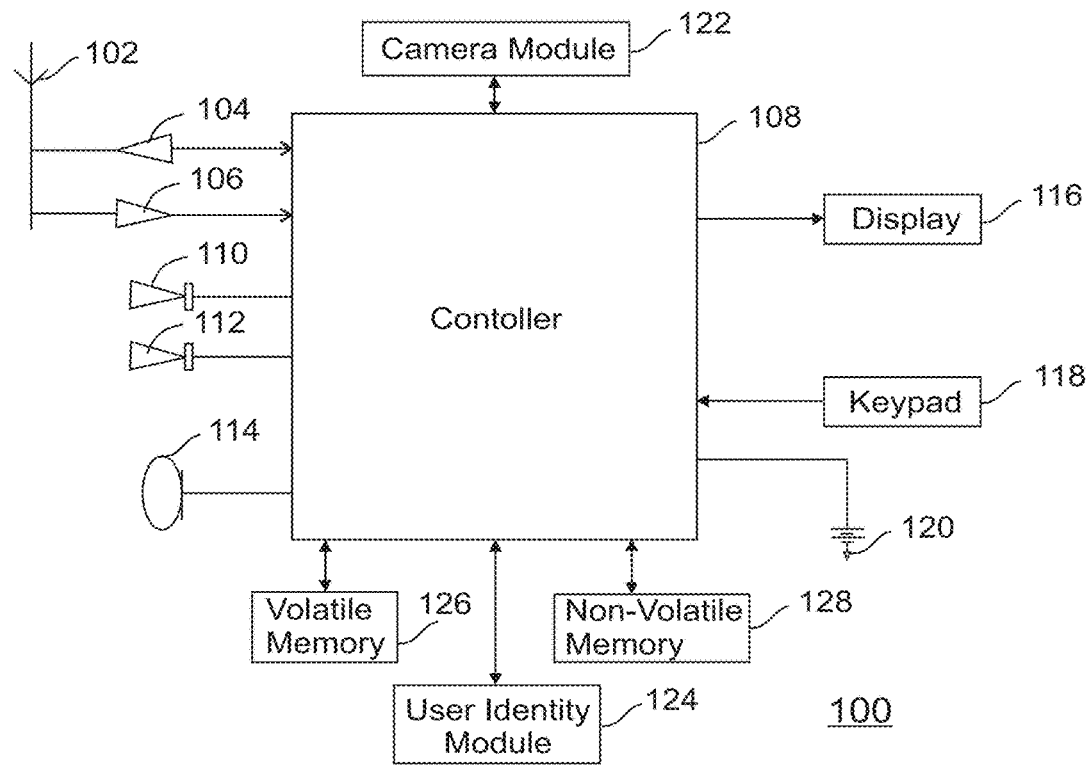
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wire line telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/ or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media-capturing element, such as a camera, video and/or audio module, in communication with the controller 108. The media-capturing element may be any means for capturing an image, video and/or audio for storage, display or transmission. In an example embodiment in which the media-capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
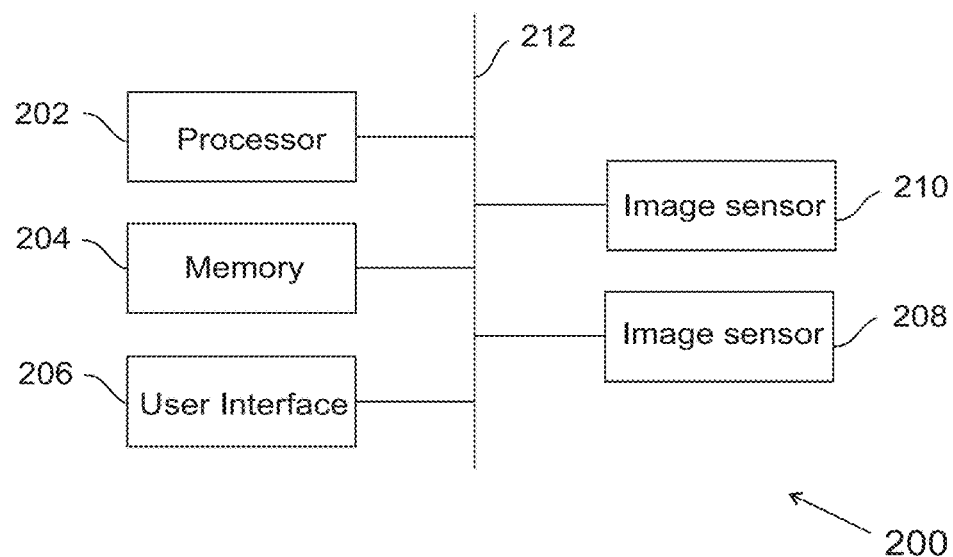
FIG. 2 illustrates an apparatus for blending of multimedia content, in accordance with an example embodiment.

FIG. 2 illustrates an apparatus 200 for blending multimedia content, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. Some examples of electronic device may include a camera. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic device may be embodied so as to include at least one image sensor, such as an image sensor 208 and image sensor 210. Though two image sensors 208 and 210 are shown in the example representation of FIG. 2, but the electronic device may include more than two image sensors or only one image sensor. The image sensors 208 and 210 may be in communication with the processor 202 and/or other components of the apparatus 200. The image sensors 208 and 210 may be in communication with other imaging circuitries and/or software, and is configured to capture digital images or to make a video or other graphic media files. The image sensors 208 and 210 and other circuitries, in combination, may be an example of at least one camera module such as the camera module 122 of the device 100. The image sensors 208 and 210, along with other components may also be configured to capture a plurality of multimedia contents such as images depicting a scene from different positions (or different angles). For example, the camera module may be used to capture a first image of a scene from a position (x), and then move through a distance (e.g., 10 meters) to another position (y) and capture a second image of the scene. In an example embodiment, the image sensors 208 and 210 may be accompanied with corresponding lenses to capture two views of the scene, such as stereoscopic views.

These components (202-210) may communicate to each other via a centralized circuit system 212 to perform blending of multimedia content. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to generate a blended multimedia content from a plurality of source multimedia contents. In an embodiment, the plurality of source multimedia contents may include a plurality of images such that the blended multimedia content may include portions from two or more of the plurality of images. In another example embodiment, the plurality of source multimedia content may include a plurality of images and at least one video such that the blended multimedia content may include portions from the plurality of images and the at least one video. In yet another example embodiment, the plurality of source multimedia content may include a plurality videos such that the blended multimedia content may include portions from the plurality of videos.

In an example embodiment, the processor 202 is configured to, with the content of the memory 204, and optionally with other components described herein, to cause the apparatus 200 to facilitate access of the plurality of source multimedia content. In an example embodiment, at least one of the plurality of source multimedia content may include corresponding depth information. In an embodiment, the corresponding depth information may include depth maps associated with the at least one of the plurality of source multimedia content. Example of the plurality of source multimedia content and the depth maps associated with the at least one of the plurality of source multimedia content are illustrated and explained in detail with reference to FIGS. 3A and 3B. In an example embodiment, a processing means may be configured to facilitate access of the plurality of source multimedia content where at least one of the plurality of source multimedia content may be associated with the depth information. An example of the processing means may include the processor 202, which may be an example of the controller 108, and/or the image sensors 208 and 210.

In an example embodiment, the processor 202 is configured to, with the content of the memory 204, and optionally with other components described herein, to cause the apparatus 200 to determine the corresponding depth information associated with the at least one of the plurality of source multimedia content. In an example embodiment, a stereo camera may capture the plurality of source multimedia content, such that the depth information associated with the plurality of source multimedia content may be determined. In some other example embodiments, the plurality of source multimedia content may be received from a camera capable of capturing multiple views of a scene, for example, a multi-baseline camera, an array camera, plenoptic camera and a light field camera. In some example embodiments, the plurality of source multimedia content may be prerecorded or stored in an apparatus 200, or may be accessed from sources external to the apparatus 200. In such example embodiments, the apparatus 200 may be caused to access the plurality of source multimedia content from external storage medium such as DVD, Compact Disk (CD), flash drive, memory card, or from external storage locations through Internet, Bluetooth®, and the like. In an example embodiment, a processing means may be configured to facilitate determination of the corresponding depth information associated with the at least one of the plurality of source multimedia content. An example of the processing means may include the processor 202, which may be an example of the controller 108, and/or the image sensors 208 and 210.

In an example embodiment, the processor 202 is configured to, with the content of the memory 204, and optionally with other components described herein, to cause the apparatus 200 to generate a blend map from the plurality of source multimedia content. In an embodiment, the blend map may include a plurality of depth layers. In an embodiment, at least one depth layer of the plurality of depth layers may be associated with a respective depth limit. In an example embodiment, the blend map may include two or more layers from among a foreground layer, a middle-ground layer and a background layer. For example, the blend map may include a foreground layer, a plurality of middle ground layers and a background layer. In another example, the blend map may include a foreground layer, a middle ground layer and a background layer. In yet another example embodiment, the blend map may include a foreground layer, and a background layer. An example blend map is illustrated and explained with reference to FIG. 4.

In an embodiment, a depth layer of the plurality of depth layers associated with the blend map may be defined by selecting pixels of the respective depth layer from a source multimedia content from among the plurality of source multimedia content. In an embodiment, the pixels of the depth layers may be selected based on a respective depth limit associated with the depth layer and the depth information of pixels. In an embodiment, the depth information of the pixels may be determined from the respective depth maps of the source multimedia content comprising the pixels. In an example embodiment, the depth limit associated with a depth layer may pertain to an extent of depth of the depth layer with respect to a reference location. In an embodiment, the reference location may include a location of a camera that is configured to capture the plurality of source multimedia content.

In an embodiment, the foreground layer may include a least value of the depth limit as compared to the values of depth limit associated with the middle-ground layer and the background layers since the pixels corresponding to the foreground layer may be located closest to the camera. Similarly, the middle-ground layer comprises a value of the depth limit that is higher than the corresponding value for the foreground layer but lower than the corresponding value for the background layer, since the pixels corresponding to the middle-ground layer may be located at a farther location as compared to the location of the pixels of the foreground layer, but closer than the location of pixels associated with the background layer when seen from the reference location.

In an embodiment, the processor 202 is configured to, with the content of the memory 204, and optionally with other components described herein, to cause the apparatus 200 to select the pixels of the plurality of depth layers from the source multimedia content from among the plurality of source multimedia content based on the depth limit associated with the respective depth layer and the corresponding depth information of the source multimedia content. For example, the pixels for the foreground layer may be selected from the source multimedia content by selecting pixels from one or more of the source multimedia content having a depth thereof within the depth limit of the foreground layer. In an example embodiment, a processing means may be configured to select the pixels of the plurality of layers of the blend map from the source multimedia content from among the plurality of source multimedia content. An example of the processing means may include the processor 202, which may be an example of the controller 108.

In an example embodiment, the processor 202 is configured to, with the content of the memory 204, and optionally with other components described herein, to cause the apparatus 200 to blend the plurality of source multimedia content based on the blend map. In an embodiment, the blending of the plurality of source multimedia content based on the blend map may facilitate in generation of a blended multimedia content. In an embodiment, the blended multimedia content includes a plurality of layers associated with the blend map. In an example embodiment, a processing means may be configured to generate the blended multimedia content based on the blend map. An example of the processing means may include the processor 202, which may be an example of the controller 108.

In an example embodiment, the blended multimedia content may include pixels for the foreground layer and middle-ground layer being selected from the source images, while the background layer may include pixels selected from a source video. In an example embodiment, the foreground layer and the middle ground layer may include the pixels selected from the source images, while the background layer may be generated without utilizing the blend map. For example, the blend map may include the unset pixels associated with the plurality of the source multimedia content. In an embodiment, the unset pixels may include those pixels which are not utilized in generating the foreground and/or middle-ground depth layers. In an alternate embodiment, for generating the background layer, the pixels may be selected from the source multimedia content that are associated with the least depth at that location.

In an embodiment, the blended multimedia content may be generated from the blend map including a foreground layer and a background layer and no middle ground layer. For example, the plurality of source multimedia content utilized for generating the blended multimedia content may include two images such that portions from the two images may form the foreground layer and the background layer of the blend map associated with the blended multimedia content. As already discussed, the portions from the two images may be selected based on the depth information associated with the respective portions and the corresponding depth limits associated with the foreground layer and the background layer of the blended multimedia content. In an example embodiment, only one of the two source multimedia contents may include corresponding depth information, so the portions of the source multimedia content including the corresponding depth information may be utilized for forming the foreground of the blended multimedia content while the source multimedia content devoid of the depth information may form the background of the blended multimedia content. In another example embodiment, both the images may include corresponding depth information, so the background layer and the foreground layer of the blend map associated with the blended multimedia content may include portions from the two source images such that the depth of the portions may lie within the respective depth limits of the background layer and the foreground layer of the blend map.

In an embodiment, the blended multimedia content may be generated from the blend map including a foreground layer, a background layer and at least one middle ground layer. In an example embodiment, the blend map may be generated from the plurality of source multimedia content being generated by utilizing at least two source multimedia content. For example, the plurality of images may include two source multimedia contents such that one of the source multimedia content may be a video. In an embodiment, based on the respective depth of the portions of the source multimedia content and the corresponding depth limits associated with the foreground layer and the background layer of the blend map, the portions of the video and the plurality of images may form the background and/or the foreground of the blended multimedia content. In an embodiment, both the source multimedia contents may include videos, and based on the depth of the portions in the videos and the depth limits associated with the foreground and the background layers, the portions of the videos may form the background layer and the foreground layer of the blend map associated with the blended multimedia content.

In an embodiment, the blended multimedia content may be generated from the plurality of source multimedia content comprising three source multimedia contents. In an embodiment, the three source multimedia contents may include one or more images and at least one video. For example, the three source multimedia content may include one image and two videos, so that the blended multimedia content may be generated by combining portions of the image and the two videos based of the depth of the portions and the depth limit of the depth layers of blend map associated with the blended multimedia content. In another example, the three source multimedia contents may include two images and one video such that the portions of the two images may form the foreground layer and the middle ground layer, and the video may form the background layer of the blend map associated with the blended multimedia content. Alternatively, the video may form the foreground layer or the middle ground layer and the remaining layers may be formed by the portions of the two images. It may be noted that the portions of the two images and the video may be combined in multiple ways to generate the plurality of layers of the blended multimedia content based on the depth of respective portions and depth limits of the multiple layers.

In an embodiment, the blended multimedia content may be generated from the plurality of source multimedia content comprising a plurality of videos. For example, the plurality of source multimedia content may include three videos such that two videos may be stereo videos, and the third video may be a non-stereo video. The stereo videos may include depth information, and portions of the stereo videos may be utilized for generating the foreground layer and the middle ground layer of the blend map while the third non-stereo video may be utilized for generating the background layer of the depth map.

In an embodiment, the blended multimedia content may be generated from the plurality of source multimedia content comprising a plurality of images. For example, the plurality of source multimedia content may include three images. In an embodiment, two of the three images may include depth information. In an embodiment, the portions of the two images that may include the depth information may be utilized for generating the foreground layer and the middle ground layer, and the third image may be utilized for generating the background layer of the blend map associated with the blended multimedia content. An example illustrating the plurality of multimedia content comprising the three images and depth maps thereof are described in detail with reference to FIGS. 3A and 3B.

In various embodiments, the multiple layers of the blended multimedia content may include portions being selected from the plurality of source multimedia content based on respective depth information of the portions and the depth limit assigned to the multiple layers. For example, one of the source multimedia content may include portions associated with its foreground such that the depth of such portions may lie within the depth limit assigned to the middle ground of the blend map associated with the blended multimedia content. Such portions may be selected from the foreground of the source multimedia content and may be utilized for generating the middle ground layer of the blend map associated with the blended multimedia content. As discussed herein, in various embodiments, the portions of the plurality of source multimedia contents may be combined in multiple ways based on the depth thereof and the depth limit assigned to the multiple layers of the blend map associated with the blended multimedia content.

Figure 3A:
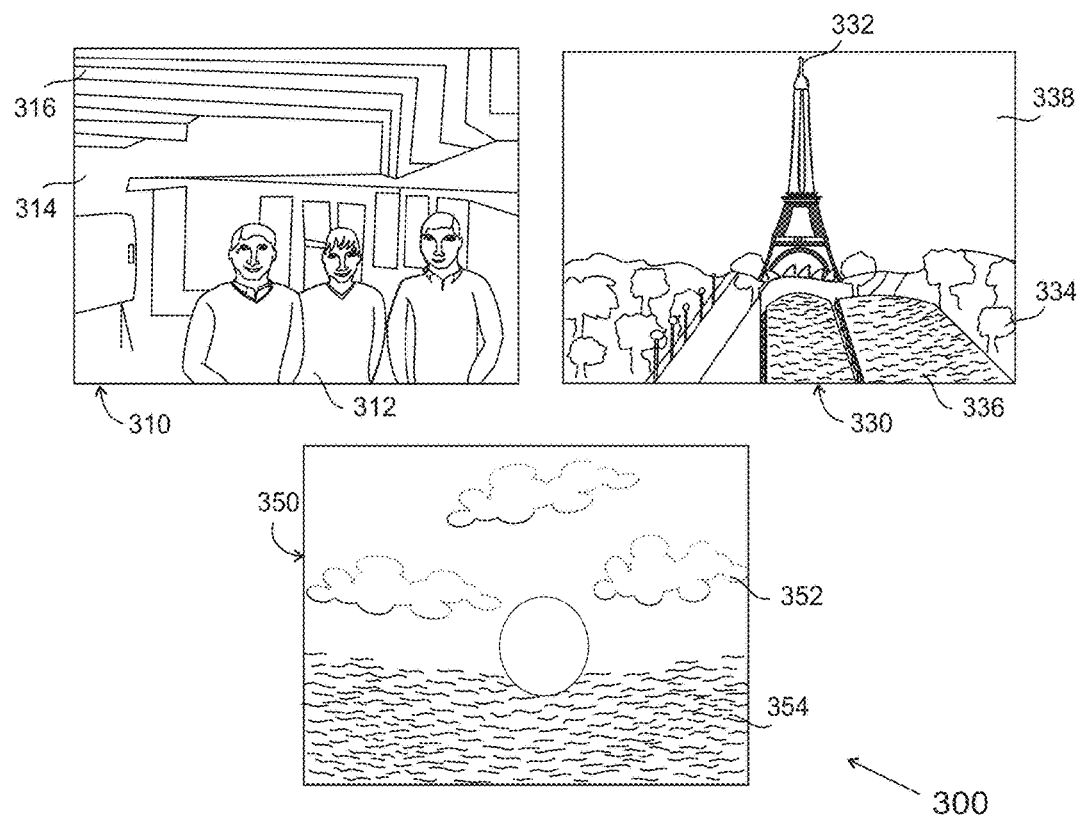
FIG. 3A illustrates an example representation of a plurality of source multimedia content, in accordance with an example embodiment.

FIG. 3A illustrates an example of a plurality of source multimedia content 300, in accordance with an example embodiment. In an embodiment, the plurality of source multimedia content may include a plurality of images. As an example, the plurality of source multimedia content 300 is shown to include three images, an image 310, an image 330 and an image 350. The images 310, 330, 350 may be captured by a media capturing module, such as the camera module 122 of the device 100 (FIG. 1) or the sensor such as the sensors 208 and 210 of the apparatus 200 (FIG. 2). In other examples, at least one of the plurality of source multimedia content 310, 330, 350 may be captured by a camera such as multi-baseline cameras, array cameras, light-field cameras and plenoptic cameras that are capable of determining depth information of the at least one of the plurality of source multimedia content.

In an example embodiment, the plurality of source multimedia content comprises various portions being located at different depths with respect to a reference location. As described with reference to FIG. 2, the 'depth' of a portion in a multimedia content may refer to the distance of the pixels constituting the portion from a reference location, such as a camera location. For example, as illustrated in FIG. 3, the first source image 310 includes image of three persons represented by numeral 312, a wall 314, and a roof 316, such that the pixels constituting the three persons 312 may be located at a depth which may be different from the depth of pixels constituting the wall 314 and/or the roof 316. The second source image 330 is shown to include a tower 332 with other portions, comprising for example trees 334, water body 336, and the like. The pixels constituting the tower 332 may be located at a depth which may be different from the depth of pixels constituting the trees 334, and the water body 336. The third source image 350 may include image of scenery comprising clouds 352, a water body 354, and the sun. In an example embodiment, the depth of various portions in at least one of the plurality of source images, for example, the first source image 310 and the second source image 330 may be determined from the depth maps associated with the respective source images. In an embodiment, the portions of the third source image 350 may comprise highest depth as compared to the depth of portions of the first source image 310 and the second source image 330.

In an example embodiment, one of the plurality of source images may be utilized for generating a background layer of the blended multimedia content. For example, the third source image may be utilized for generating the background of the blended multimedia content. In an embodiment, the depth map of a source multimedia content that may be utilized for generating the background layer of the blended multimedia content may not be determined. This is explained in more detail with reference to FIG. 3B, where a blend map comprising depth layers of the first source image and the second source image are shown, and the depth layer of the third source image 350 is precluded since the pixels of the third source image 350 may be directly utilized for generating the background layer of the blended multimedia content.

Figure 3B:
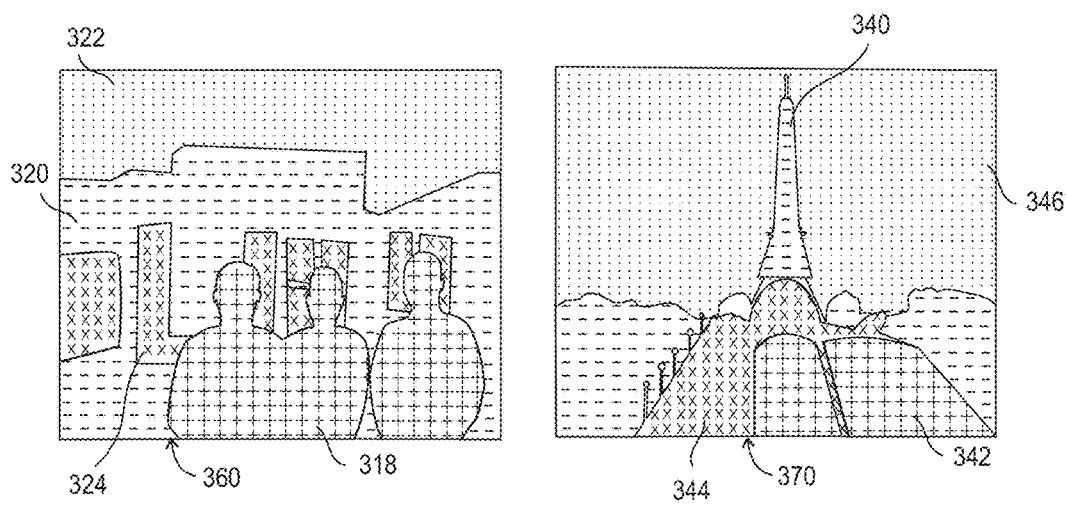
FIG. 3B illustrates example depth maps for a plurality of source multimedia content, in accordance with an example embodiment.

Referring now to FIG. 3B, the first source image 310 and the second source image 330 may be associated with respective depth maps, for example, depth maps 360 and 370, respectively that may include the respective depth information associated with various portions in the respective source images. For example, the depth map 360 of the first source image 310 is shown to include four different layers 318, 320, 322, and 324 indicative of distinct depths of portions located at those depths. The layers 318, 320, 322, and 324 are indicated by varying a shading of the layers 318, 320, 322, and 324. Also, the depth map 370 of the second source image 330 is shown to include four different layers 340, 342, 344, and 346 indicative of depths of portions located at those depths.

In an example embodiment, one of the three source images such as the third source image may be utilized for generating the background layer of the blended multimedia content. In an example embodiment, the depth map of the source image that may be utilized for generating the background layer of the blended multimedia content may not be determined. In an embodiment, the pixels for configuring the background layer of the blended multimedia content may be selected from the portions of the source images having a least depth at that position. In an embodiment, the background layer may be generated by utilizing the unset pixels associated with the source multimedia content.

In an example embodiment, the first source multimedia content, the second source multimedia content and the third source multimedia content may comprise images such as the source images 310, 330 and 350, respectively. In an embodiment, the source multimedia content that may be utilized for generating the foreground layer and the middle ground layer of the blend map may include depth information associated with respective portions thereof. Herein, since the source images 310 and 330 comprise respective depth information, and the source image 350 may not comprise the respective depth information, the source images 310, 330 may be utilized for generating the foreground layer and the middle ground layer, and the source image 350 may be utilized for generating the background layer of the blend map. Herein, the plurality of source multimedia contents are assumed to include three images. In some other embodiments, the plurality of source multimedia content may include one or more images and at least one video. In some embodiments, the plurality of source multimedia content may include a plurality of videos, for example, one or more stereo videos for generating at least one of the foreground layer and the middle ground layer, and a non-stereo video for generating the background layer.

Figure 4:
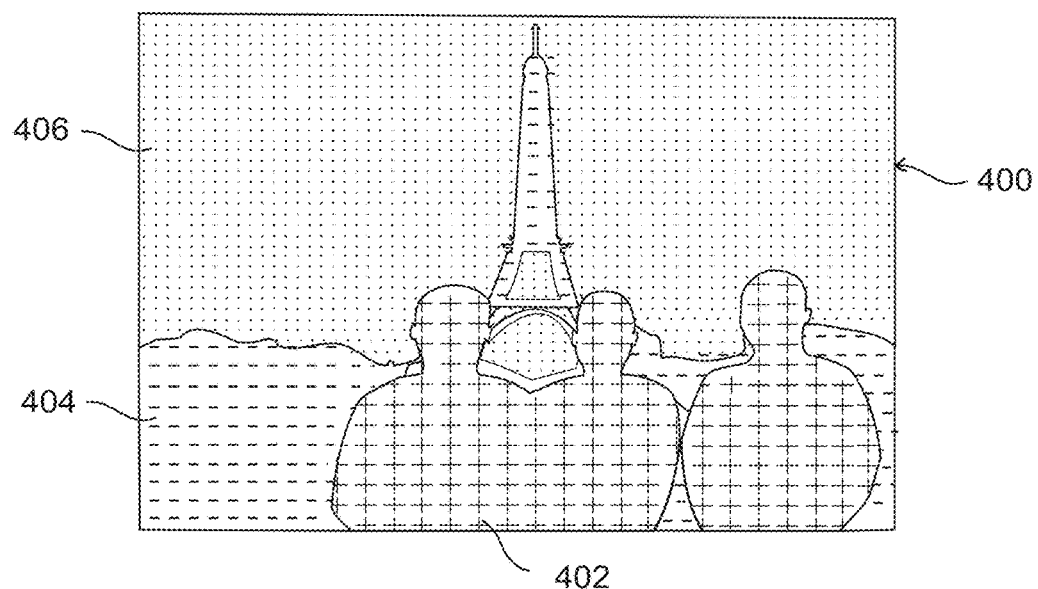
FIG. 4 illustrates an example representation of a blend map, in accordance with an example embodiment.

FIG. 4 illustrates an example representation of a blend map 400 associated with a plurality of source multimedia content, in accordance with an example embodiment. The blend map 400 may include a plurality of depth layers such as a foreground layer 402, a middle ground layer such as a middle ground layer 404 and a background layer 406. The plurality of depth layers such as the depth layers 402, 404 and 406 of the blend map 400 may be sourced from different source multimedia content such as the source multimedia contents 310, 330 and 350 (FIG. 3). In an example embodiment, the plurality of source multimedia content 310, 330 and 350 may be images. In other embodiments, the plurality of source multimedia content may include one or more images and one or more videos. In some other embodiments, the plurality of source multimedia content may include a plurality of videos. As explained with reference to FIG. 3A, the images 310 and 330 may be associated with respective depth maps such as depth maps 360 and 370, respectively while the depth map for the image 350 may not be determined since the pixels of the image 350 may be utilized directly for defining the background of the blended multimedia content.

In an embodiment, the depth layers of the plurality of depth layers may be associated with a corresponding depth limit. In an embodiment, a depth limit may be assigned to two or more depth layers of the plurality of depth layers of the blend map 400. For example, depth limits may be assigned to the foreground layer and the middle ground layer respectively, while the background layer may be generate by selecting pixels from a source multimedia content having a least depth in that position. In an embodiment, the depth limit associated with the foreground depth layer may be lesser than the depth limit associated with the middle ground depth layer.

The blend map 400 may be generated based on the depth limit associated with the plurality of depth layers and the depth information associated with the plurality of source multimedia content. For example, assuming that the foreground layer and the middle ground layer may be associated with a first depth limit and a second depth limit, respectively the blend map 400 may include those pixels from the plurality of source multimedia content to form the foreground layer that may be associated with depth less than the first depth limit. In a similar manner, the blend map 400 may include those pixels from the plurality of source multimedia content to form the middle ground layer that may comprise a depth value within the second depth limit. In an embodiment, for generating the background layer, the blend map may select pixels from the source multimedia content having a least depth in that position. In another embodiment, the background layer may be generated by utilizing unset pixels associated with the plurality of source multimedia content.

As explained in the example herein, two or more of the plurality of the source multimedia content are assumed to be images. In some other embodiments, the plurality of source multimedia content may include at least one video also. For example, the plurality of source multimedia content may include two or more image and one or more videos. In some embodiments, the plurality of source multimedia content may include only videos. Also, as explained with reference to FIG. 4, the blend map is assumed to include a foreground layer, a middle ground layer and a background layer. It will however be understood that in alternate embodiments, the blend map may include only the foreground layer and the background layer. In an embodiment, the blend map may be utilized for blending the plurality of multimedia content to generate a blended multimedia content. An example of the blended multimedia content is illustrated and described with reference to FIG. 5.

Figure 5:
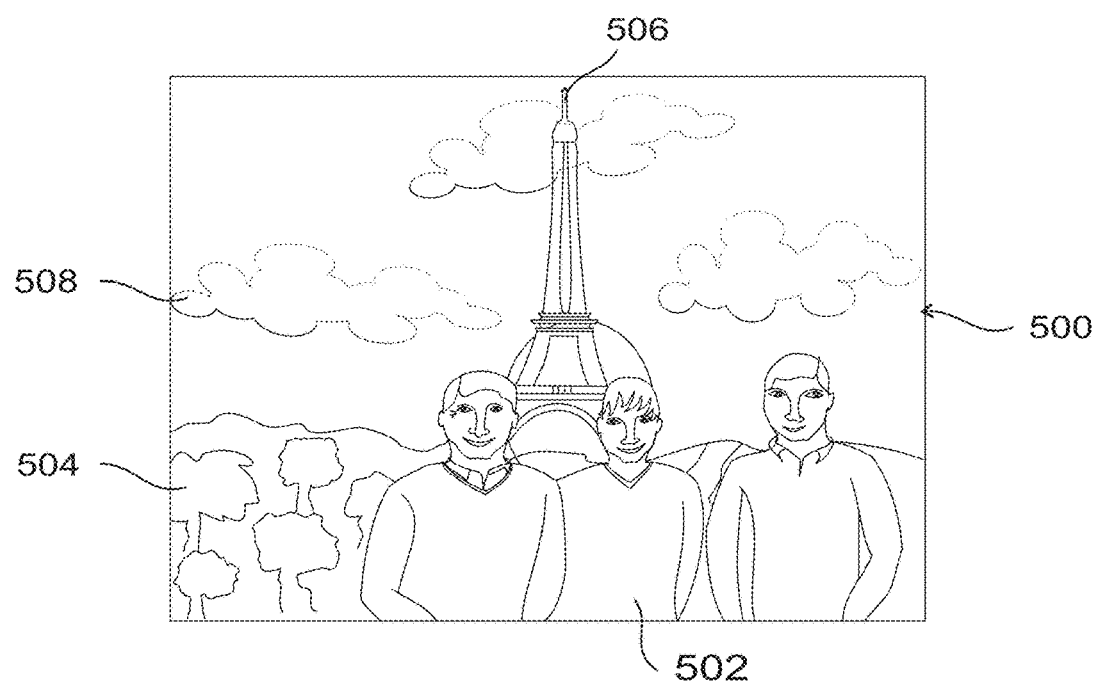
FIG. 5 illustrates an example representation of blended multimedia content, in accordance with an example embodiment.

FIG. 5 illustrates an example representation of a blended multimedia content 500, in accordance with an example embodiment. The blended multimedia content 500 illustrated herein may be generated by blending pixels from a plurality of source multimedia content, for example, the source multimedia content 310, 330, 350 (FIG. 3), and generating a blend map, for example, the blend map 400 (FIG. 4). As illustrated herein, the blended multimedia content 500 includes portions (or pixels) being selected from the plurality of source multimedia content 310, 330 and 350 based on the depth of those portions in the respective source multimedia content and a corresponding depth limit associated with a plurality of depth layers of the blend map. As discussed earlier, the plurality of depth layers may include two or more of a foreground layer, a middle ground layer and a background layer.

The blended multimedia content 500 includes foreground comprising portions such as image of three persons 502 that are selected from the first source multimedia content 310 (for example, the image of three persons 318 in FIG. 3A). Similarly, the blended multimedia content 500 includes middle ground comprising portions such as trees 504 and a tower 506 that are selected from the second source multimedia content 330 (for example, the portion comprising the tower 332 and the trees 334, respectively in FIG. 3A). Herein, the background of the blended multimedia content may include pixels selected from the third source multimedia content 350. For example, the background of the blended multimedia content 500 is shown to include, among other things, pixels associated with the clouds 508 that are selected from the portions of the third multimedia content 330 (for example, the portions comprising clouds 352). In the present example, the portions and/or pixels of the blended multimedia content 500 are assumed to be selected from the plurality of source images. However, it will be noted that additionally or alternatively, the portions and/or pixels of the blended multimedia content 500 may be selected from one or more videos. In an embodiment, the blended multimedia content may be generated such that it includes only the foreground and the background.

Figure 6:
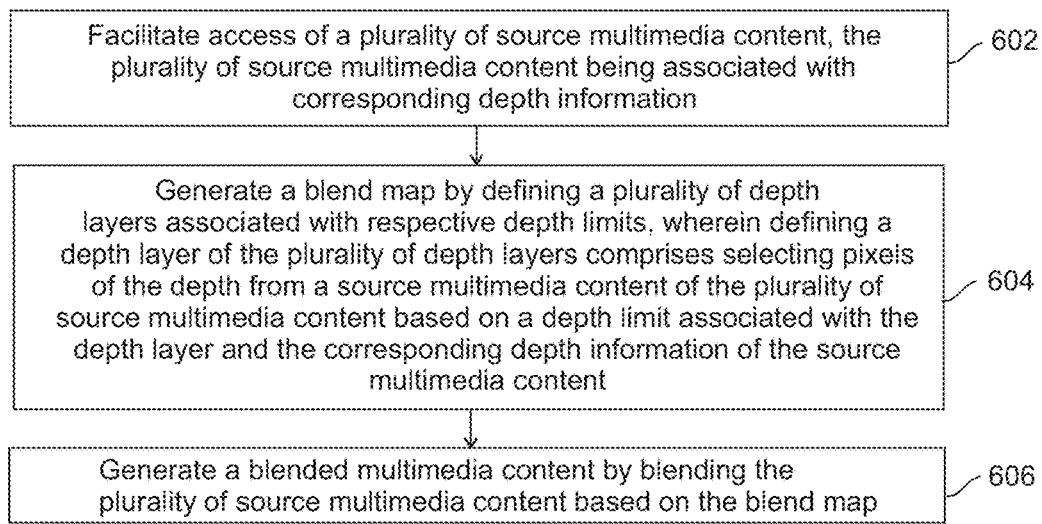
FIG. 6 illustrates an exemplary method for blending multimedia content, in accordance with an example embodiment.

FIG. 6 illustrates an exemplary method 600 for blending multimedia content, in accordance with an example embodiment. In an example embodiment, the blending of a plurality of source multimedia content may be performed by selecting portions from the plurality of source multimedia content based at least on a depth information associated with the portions. The method 600 depicted in the flow chart may be executed by, for example, the apparatus 200 of FIG. 2.

At block 602, the method 600 includes facilitating access of a plurality of source multimedia content. In an embodiment, the plurality of source multimedia content may include one or more images and at least one video. In an embodiment, the plurality of source multimedia content may include a plurality of images. In an embodiment, the plurality of source multimedia content may include a plurality of videos. In an embodiment, at least one of the plurality of source multimedia content may include corresponding depth information. In an embodiment, the depth information may include depth maps associated with the respective plurality of source multimedia content. As described in reference to FIG. 2, the plurality of source multimedia content may be received from a media capturing device including two sensors and related components, or from external sources such as DVD, Compact Disk (CD), flash drive, memory card, or received from external storage locations through the Internet, Bluetooth®, and the like. Examples of the plurality of source multimedia content may be the source multimedia content 310, 330 and 350 as shown and explained with reference to FIG. 3A. Examples of the depth map associated with at least one of the plurality of the source multimedia content 310, 330 and 350 is illustrated and described with reference to FIG. 3B.

At block 604, the method 600 includes generating a blend map by defining a plurality of depth layers, wherein at least one depth layer of the plurality of depth layers is associated with a corresponding depth limit. An example of the blend map is illustrated and explained with reference to FIG. 4. In an embodiment, the blend map may include a plurality of depth layers. In an embodiment, a depth layer of the plurality of depth layers may be defined by selecting pixels of the depth layer from a source multimedia content of the plurality of source multimedia content based on a depth limit associated with the depth layer and the depth information of the source multimedia content. In an embodiment, depth limits may be assigned to at least one of the plurality of depth layers such that the pixels associated with the respective depth layer may be selected from the plurality of source multimedia content when the depth of the pixels is within the assigned depth limit of the respective depth layer.

At block 606, the method 600 includes blending the plurality of source multimedia content based on the blend map. An example illustrating a blended multimedia content is illustrated and described with reference to FIG. 5. In an embodiment, the blending of the plurality of source multimedia content may facilitate in generation of a blended multimedia content. In an embodiment, the blended multimedia content may include pixels being sourced from the plurality of source multimedia content based on the blend map. The blending of the plurality of source multimedia content to generate a blended multimedia content is explained with reference to FIG. 5.

Figure 7:
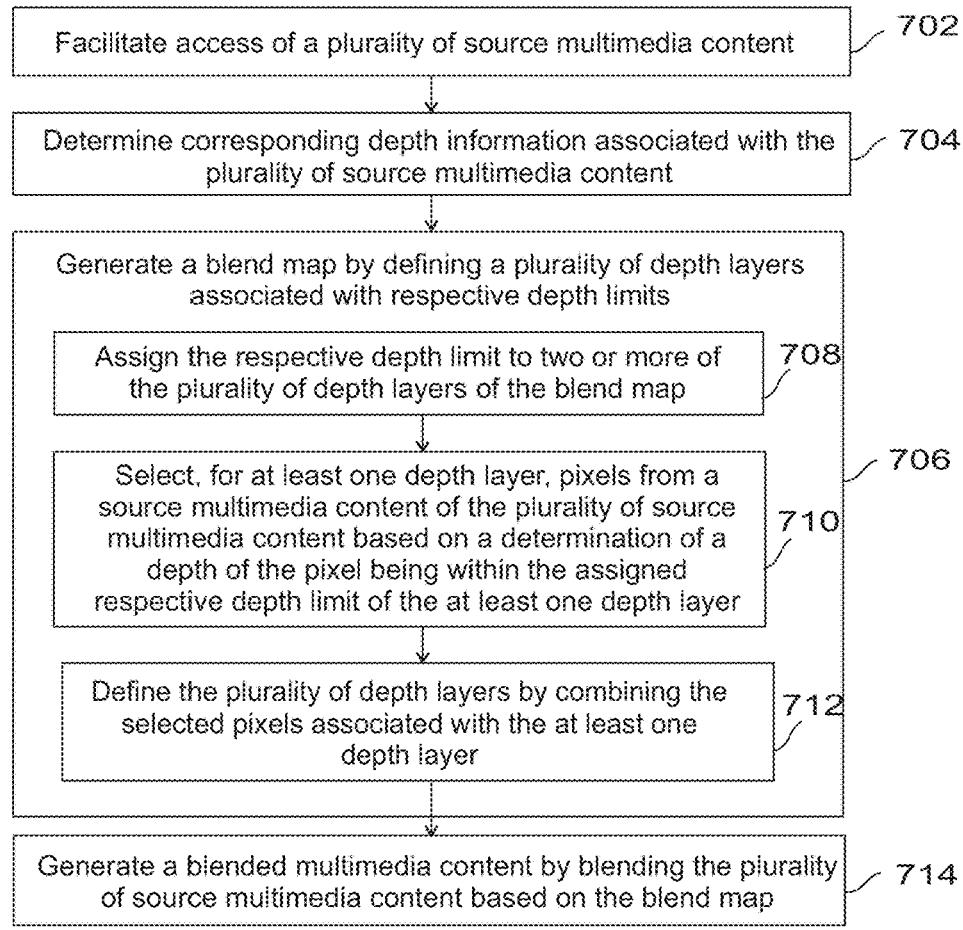
FIG. 7 illustrates an exemplary method for blending multimedia content, in accordance with another example embodiment.

FIG. 7 illustrates an exemplary method 700 for blending multimedia content, in accordance with another example embodiment. In an example embodiment, the method 700 includes selectively combining a plurality of source multimedia content to generate a blended multimedia content. The method 700 depicted in the flow chart may be executed by, for example, the apparatus 200 of FIG. 2.

At block 702, the method 700 includes facilitating access of a plurality of source multimedia content. In an embodiment, the plurality of source multimedia content may be associated with corresponding depth information. In an embodiment, the corresponding depth information may include corresponding depth maps of the plurality of source multimedia content. As described in reference to FIG. 2, the plurality of source multimedia content may be received from a media capturing device including two sensors and related components, or from external sources such as DVD, Compact Disk (CD), flash drive, memory card, or received from external storage locations through Internet, Bluetooth®, and the like. Examples of the plurality of source multimedia content may be the source multimedia content 310, 330 and 350 (FIG. 3A).

At block 704, the method 700 includes determining the corresponding depth information associated with at least one of the plurality of source multimedia content. In an embodiment, the corresponding depth information may include a depth map associated with a respective at least one source multimedia content. Example depth maps for at least one of the plurality of source multimedia content are illustrated and described with reference to FIG. 3B. In some embodiments, the depth maps for the source multimedia content that are utilized for generating the background layer may not be determined. Instead, pixels or portions from such source multimedia content may be directly used for generating the background layer of the blended multimedia content.

In an embodiment, the depth map for the plurality of source multimedia content may be determined by capturing the plurality of source multimedia content using a stereo camera. In some other example embodiments, at least one of the plurality of source multimedia content may be received from a camera capable of capturing multimedia content with a corresponding depth information, for example, a multi-baseline camera, an array camera, plenoptic camera and a light field camera. In some example embodiments, the plurality of source multimedia content may be prerecorded or stored in an apparatus, for example, the apparatus 200 (FIG. 2), or may be accessed from sources external to the apparatus 200.

At block 706, the method 700 includes generating a blend map comprising a plurality of depth layers associated with a respective depth limit. In an embodiment, a depth layer of the plurality of depth layers may be defined by selecting pixels of the depth layer from a source multimedia content of the plurality of source multimedia content based on a depth limit associated with the respective depth layer and the depth information of the source multimedia content.

At block 708, the method 706 includes assigning a respective depth limit to at least one depth layer of the plurality of depth layers of the blend map. For example, a depth limit such as a first depth limit may be assigned to the foreground layer and a second depth limit may be assigned to the middle ground layer. In an embodiment, the first depth limit may be lesser than the second depth limit. At block 710, for at least one depth layer, pixels from a source multimedia content of the plurality of source multimedia content may be selected based on a determination of a depth of the pixel being within the assigned depth limit of the respective depth layer. In an example embodiment, the depth of the pixels may be determined from the depth maps associated with the source multimedia content comprising the respective pixels. The depth maps associated with pixels for the source multimedia content are illustrated and explained with reference to FIG. 3B. At block 712, a plurality of depth layers may be defined by combining the selected pixels associated with the respective at least one depth layer. For example, as discussed with reference to FIG. 4, the pixels associated with the first depth limit may be combined to generate the foreground layer of the blend map.

At block 714, the plurality of source multimedia content may be blended based on the blend map. In an embodiment, blending of the plurality of source multimedia content may facilitate in generation of a blended multimedia content. An example of generation of the blended multimedia content is illustrated and explained with reference to FIG. 5. In an example embodiment, the blended multimedia content may include a foreground layer, a middle ground layer and a background layer. In some example embodiments, the foreground layer and the middle-ground layer of the blended multimedia content may include images and the background layer may include a video. In some embodiments, the foreground layer of the blended multimedia content may include an image whereas each of the middle-ground layer and the background layer may include distinct videos. In some example embodiments, the foreground layer, the middle ground layer and the background layers of the blended multimedia content may include videos. In some example embodiments, the blended multimedia content may include only a foreground layer and a background layer. In this embodiment, the blended multimedia content is generated based on the depth information associated with the foreground layer and utilizing the unset pixels to form the background layer.

It should be noted that to facilitate discussions of the flowcharts of FIGS. 6 and 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 600 and 700 are performed in an automated fashion. These operations involve substantially no interaction with the user. Other operations of the methods 600 and 700 may be performed by in a manual fashion or semi-automatic fashion. These operations involve interaction with the user via one or more user interface presentations.

The methods depicted in the flow charts 600 and 700 may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to combine and/or blend a plurality of source multimedia content to generate blended multimedia content. Various embodiments provide methods and apparatus for blending a plurality of source multimedia content based at least on the respective depth information associated with at least one of the plurality of source multimedia content. For instance, various embodiments provide techniques to change background, insert objects or portions and other ways of manipulating the plurality of source multimedia content to generate blended multimedia content based on depth information. Further, various embodiments offer blending a plurality of images with a video, or blending an image with a plurality of videos, or blending a plurality of images or blending a plurality of videos. Various embodiments provide techniques to at least in parts or in some embodiments automatically select at least one portion of images and/or videos from source multimedia content, so as to perform blending by using depth information associated with the at least one portions and depth limit assigned to various layers of blend map, thereby precluding a need of manually selecting the portions of the source multimedia content.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
    facilitating access, using a processor, to a plurality of source multimedia content, wherein the plurality of source multimedia content comprises at least two source multimedia content, at least one source multimedia content of the plurality of source multimedia content comprising corresponding depth information;
    generating a blend map by defining a plurality of depth layers sourced from the at least two source multimedia content, at least one depth layer of the plurality of depth layers being associated with a respective depth limit, wherein defining the plurality of depth layers comprises:
        selecting, for the at least one depth layer, pixels from the at least one source multimedia content of the plurality of source multimedia content having a depth being within the respective depth limit associated with the at least one depth layer, wherein the plurality of depth layers comprises a background layer; and
        combining the selected pixels; and
    generating, using the processor, a blended multimedia content by blending the plurality of source multimedia content based on the blend map such that the blended multimedia content includes portions from the at least two source multimedia content, wherein the background layer is blended without utilizing the blend map.

2. The method as claimed in claim 1, wherein the at least two source multimedia content comprises one or more images and at least one video.

3. The method as claimed in claim 1, further comprising determining the corresponding depth information associated with the at least one source multimedia content of the plurality of source multimedia content.

4. The method as claimed in claim 1, wherein the corresponding depth information comprises a corresponding depth map associated with the plurality of source multimedia content.

5. The method as claimed in claim 1, wherein the plurality of depth layers comprises two or more of a foreground layer, a middle-ground layer and the background layer of the blend map.

6. The method as claimed in claim 1, further comprising assigning the respective depth limit to the at least one depth layer of the plurality of depth layers.

7. The method as claimed in claim 1, wherein the depth of the pixels is determined based on the corresponding depth information associated with the plurality of source multimedia content.

8. The method as claimed in claim 5, further comprising defining the background layer of the plurality of the depth layers based on a selection of unset pixels associated with the plurality of source multimedia content.

9. An apparatus comprising:
    at least one processor; and
    at least one memory comprising computer program code, the at least one memory and the computer program code configured to, with the at least one processor, cause the apparatus to at least perform:
        facilitate access to a plurality of source multimedia content, wherein the plurality of source multimedia content comprises at least two source multimedia content, at least one source multimedia content of the plurality of source multimedia content comprising corresponding depth information;
        generate a blend map by defining a plurality of depth layers sourced from the at least two source multimedia content, at least one depth layer of the plurality of depth layers being associated with a respective depth limit, wherein defining the plurality of depth layers further causes the apparatus to:
            select, for the at least one depth layer, pixels from the at least one source multimedia content of the plurality of source multimedia content having a depth being within the respective depth limit associated with the at least one depth layer, wherein the plurality of depth layers comprises a background layer; and
            combine the selected pixels; and
        generate a blended multimedia content by blending the plurality of source multimedia content based on the blend map such that the blended multimedia content includes portions from the at least two source multimedia content, wherein the background layer is blended without utilizing the blend map.

10. The apparatus as claimed in claim 9, wherein the at least two source multimedia content comprises one or more images and at least one video.

11. The apparatus as claimed in claim 9, wherein the apparatus is further caused at least in part to determine the corresponding depth information associated with the at least one source multimedia content of the plurality of source multimedia content.

12. The apparatus as claimed in claim 9, wherein the corresponding depth information comprises a corresponding depth map associated with the plurality of source multimedia content.

13. The apparatus as claimed in claim 9, wherein the plurality of depth layers comprises two or more of a foreground layer, a middle-ground layer and the background layer of the blend map.

14. The apparatus as claimed in claim 9, the apparatus is further caused at least in part to assign the respective depth limit to the at least one depth layer of the plurality of depth layers.

15. The apparatus as claimed in claim 9, wherein the depth of the pixels is determined based on the corresponding depth information associated with the plurality of source multimedia content.

16. The apparatus as claimed in claim 13, further comprising defining the background layer of the plurality of the depth layers based on a selection of unset pixels associated with the plurality of source multimedia content.

17. A computer program product comprising at least one non-transitory computer-readable storage medium, the non-transitory computer-readable storage medium comprising a set of instructions, which, when executed by one or more processors, cause an apparatus to at least perform:

facilitate access to a plurality of source multimedia content, wherein the plurality of source multimedia content comprises at least two source multimedia content, at least one source multimedia content of the plurality of source multimedia content comprising corresponding depth information;

generate a blend map by defining a plurality of depth layers sourced from the at least two source multimedia content, at least one depth layer of the plurality of depth layers being associated with a respective depth limit, wherein defining the plurality of depth layers further causes the apparatus to:
select pixels from the at least one source multimedia content of the plurality of source multimedia content having a depth being within the respective depth limit associated with the at least one depth layer, wherein the plurality of depth layers comprises a background layer; and generate a blended multimedia content by blending the plurality of source multimedia content based on the blend map such that the blended multimedia content includes portions from the at least two source multimedia content, wherein the background layer is blended without utilizing the blend map.

18. The computer program product as claimed in claim 17, wherein the at least two source multimedia content comprises one or more images and at least one video.

19. The computer program product as claimed in claim 17, wherein the plurality of depth layers comprises two or more of a foreground layer, a middle-ground layer and the background layer of the blend map.

* * * * *